I. J. FINK.
DENTAL DRILL.
APPLICATION FILED DEC. 26, 1919.

1,358,432. Patented Nov. 9, 1920.

Inventor
I. J. Fink
By
Attorney

UNITED STATES PATENT OFFICE.

ISRAEL J. FINK, OF NEW YORK, N. Y.

DENTAL DRILL.

1,358,432.  Specification of Letters Patent.  Patented Nov. 9, 1920.

Application filed December 26, 1919. Serial No. 347,484.

*To all whom it may concern:*

Be it known that I, ISRAEL J. FINK, a citizen of the United States, residing at New York city, in the county of New York and State of New York, have invented certain new and useful Improvements in Dental Drills, of which the following is a specification.

My invention relates to improvements in dental drills, and more particularly to that class or type commonly known as "fissure burs."

The primary object of the invention is to provide a generally improved drill of this class which will be exceedingly simple in construction, cheap of manufacture, and efficient in use.

A further and very important object of the invention is to improve the form and relative arrangement of the cutting teeth and particularly the cutting faces thereof, so as to better facilitate the removal of the tooth substance and at the same time provide ample clearance through the provision of improved longitudinally extending grooves or flutes and regularly spaced parallel extending grooves.

A still further object is the provision of improved teeth at the end of the cutter head, said teeth being cut away at their rear to afford ample clearance and direct the cuttings into the longitudinally extending grooves or flutes.

A still further object is the provision of an improved form of cutting tooth of substantially triangular shape in longitudinal direction affording two cutting faces, one cutting face being directed toward the outer or free end of the drill head and the other being tangentially arranged and directed in the direction of rotation.

With the above mentioned and other ends in view, the invention consists in the novel construction, arrangement and combination of parts, hereinafter described, illustrated in some of its embodiments in the accompanying drawings, and particularly pointed out in the appended claims.

Figure 1:

Referring to the drawings, forming a part of this specification, Figure 1, is a plan view of a complete dental drill constructed in accordance with this invention.

Figure 2:
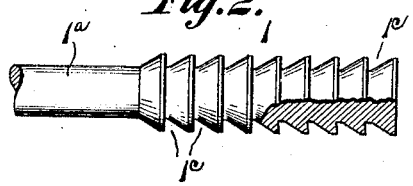

Fig. 2, an enlarged view of the cutter head in partial or semi-finished condition, illustrating in particular the manner of forming the regularly spaced rearwardly inclined circumferential grooves preparatory to the final forming operation by fluting or longitudinally grooving.

Figure 3:
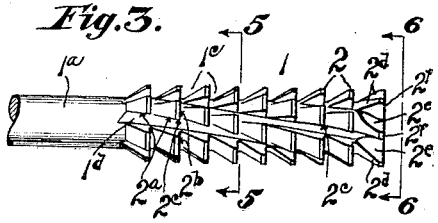

Fig. 3, a similar view of the completed cutter head.

Figure 4:
Figure 7:
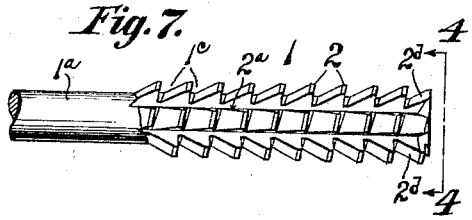

Fig. 4, an end view of the modified form shown in Fig. 7, taken on line 4—4 of that figure.

Figure 5:
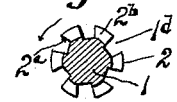

Fig. 5, a sectional view of the form shown in Fig. 3, taken on line 5—5 of that figure.

Figure 6:
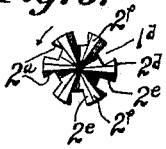

Fig 6, an end view of the same taken on line 6—6 thereof.

Fig. 7, a plan view of the modified form shown in end elevation in Fig. 4.

Similar numerals of reference designate like parts throughout all the figures of the drawings.

The improved dental drill comprises a cutter head 1, mounted on the usual shank $1^a$, and attaching shaft or spindle $1^b$.

As a convenient means or method of manufacture, the cutter head 1, is first provided with a plurality or series of regularly spaced circumferentially extending grooves $1^c$, said grooves being inclined from the outer or free end of the cutter head, as illustrated most clearly in Fig. 2, of the drawings. The grooves $1^c$, act to regularly space the teeth longitudinally on the cutter head as hereinafter described, and to give the teeth the proper form longitudinally.

As a means of properly spacing the teeth circumferentially and particularly affording proper clearance for the cuttings at the rear of the cutting faces of the teeth, the cutter head is provided with properly spaced longitudinally extending grooves or flutes $1^d$, said grooves or flutes $1^d$, being so tapered as to provide tangentially arranged cutter faces $2^a$, in the direction of rotation of the teeth 2, (see Figs. 5 and 6) and afford proper clearance at the rear of the teeth. It will also be seen that the grooves $1^c$, provide cutter faces $2^b$, extending toward the free end of the cutter head and providing cutter edges $2^c$, at the meeting edges of the cutter faces $2^a$ and $2^b$.

As a means of providing properly arranged and relatively disposed end cutters, the end teeth $2^d$, are cut away at their rear, as at $2^e$, such cut away or forwardly beveled portions $2^e$, at the rear of the cutters forming communicating spaces leading to the longitudinal grooves or flutes $1^d$, and affording ample clearance and at the same time forming radial end cutters 2f, of superior form and arrangement.

The longitudinally extending grooves or flutes 1d, are preferably turned somewhat spirally, as indicated in Fig. 3, thereby improving the form of the cutter faces 2a, and the cutting edges 2e.

Referring now to the modified form shown in Figs. 4 and 7, of the drawings, it will be seen that the grooves or flutes 1d, are arranged in parallel relation with relatively straight sides and that the parallel grooves 1c, are inclined thereby modifying the construction and arrangement of the teeth and in such construction the drill is preferably rotated from right to left, as indicated by the arrow in Fig. 4, it being apparent in this instance, however, that by reversing the inclination of the grooves 1c, a drill rotating in an opposite or right direction may be formed. In such instance, it will also be observed upon reference particularly to Fig. 4, of the drawings, that the radial end cutters 2g, are of a different formation than the end cutters 2f, shown in Figs. 1, 3 and 6, of the drawings.

From the foregoing description, taken in connection with the accompanying drawings, the operation and advantages of my invention will be readily understood.

Having thus described some of the embodiments of my invention, without having attempted to set forth all the forms in which it may be made or all the modes of its use, what I claim and desire to secure by Letters Patent, is—

1. In a dental drill, a cutter head embodying longitudinally and circumferentially extending grooves forming corresponding spaced cutting teeth inclined from the free end of the cutter head and having undercut faces.

2. In a dental drill, a cutter head provided with spaced tapered cutting teeth having cutter faces directed toward the outer end thereof and tangentially arranged cutter faces in the direction of rotation.

3. In a dental drill, a cutter head made up of a plurality of longitudinally and circumferentially spaced cutting teeth of substantially triangular shape in longitudinal section, the cutter teeth at the end of said head having cutaway portions at their rear and having their cutting edges radially arranged from the longitudinal center of said head.

4. In a dental drill, a cutter head having spaced longitudinally and circumferentially extending flutes and grooves forming correspondingly spaced tapered cutting teeth, the latter being inclined from the point of the cutter head and having ends extending at right angles to the axis of rotation and provided with cutter faces extending tangentially to such axis.

5. In a dental drill, a cutter head having longitudinal flutes and regularly spaced parallel extending grooves inclined from the point of said cutter head forming correspondingly spaced cutter teeth, the teeth at the end of said cutter head being cut away and inclined at their rear to provide clearance and arranged in radial planes forming end cutters.

6. In a dental drill, a cutter head having spaced longitudinally and circumferentially extending flutes and grooves forming correspondingly spaced cutting teeth, the latter being inclined from the point of the cutter head and having end cutters extending at substantially right angles to the axial plane of rotation and provided with undercut side faces formed tangentially to such axial plane of rotation.

7. In a dental drill, a cutter head having longitudinally extending flutes and regularly spaced parallel extending grooves inclined from the front of said cutter head forming cutter teeth, the teeth at the end of said cutter head being inwardly inclined at their rear to afford clearance and direct the cuttings into said flutes and forming radial end cutters.

8. In a dental drill, a cutter head made up of a plurality of longitudinally and circumferentially extending flutes and grooves, respectively, forming spaced cutting teeth of triangular shape longitudinally and provided with tangential cutting faces, the cutting teeth at the end of said head having cutaway portions at their rear leading into said longitudinal flutes and having radially arranged end cutters.

In testimony whereof I have affixed my signature.

ISRAEL J. FINK.